UNITED STATES PATENT OFFICE.

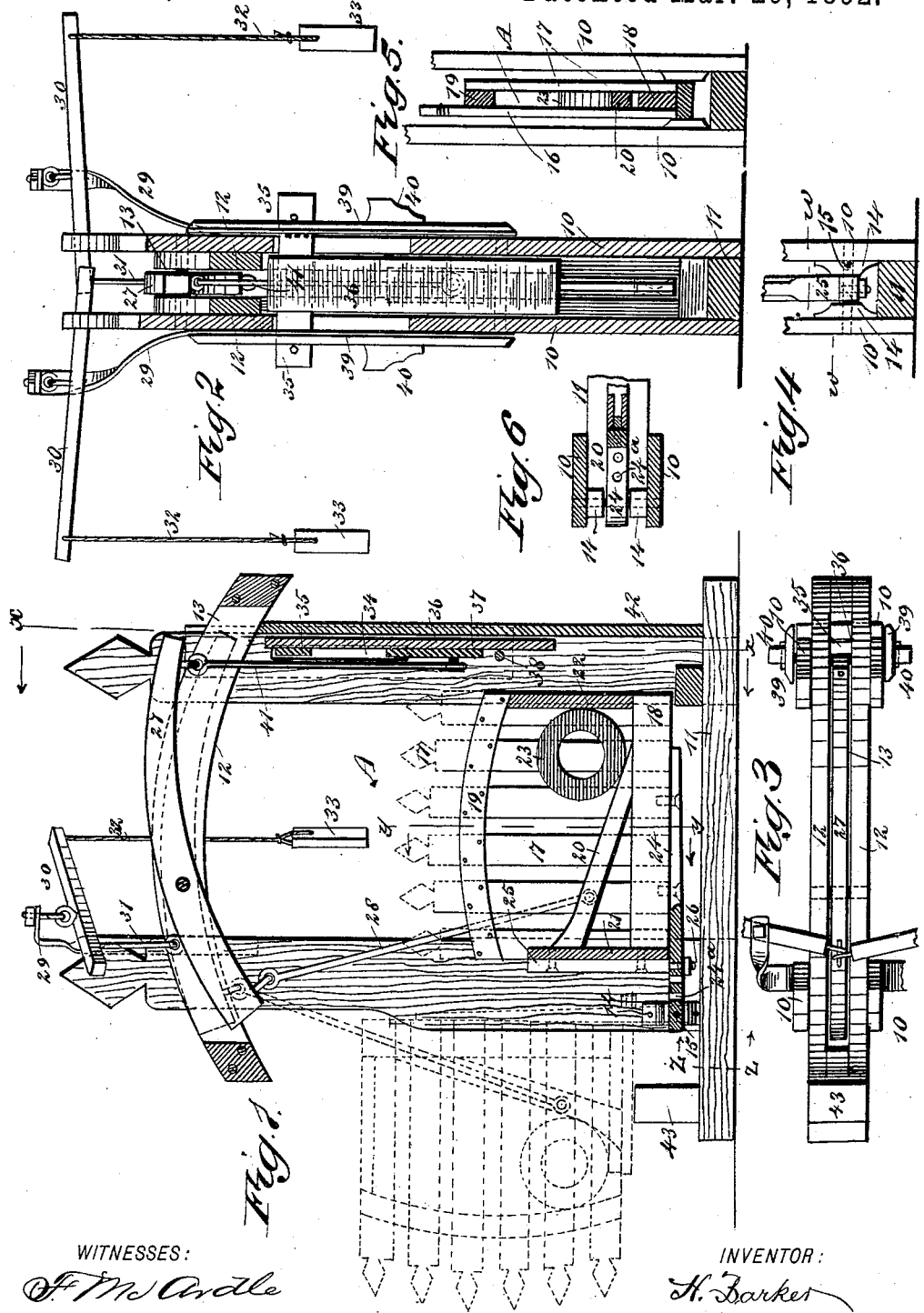

HIRAM BARKER, OF ST. JOSEPH, MISSOURI.

GATE.

SPECIFICATION forming part of Letters Patent No. 471,935, dated March 29, 1892.

Application filed July 23, 1891. Serial No. 400,472. (No model.)

*To all whom it may concern:*

Be it known that I, HIRAM BARKER, of St. Joseph, in the county of Buchanan and State of Missouri, have invented a new and useful Improvement in Gates, of which the following is a full, clear, and exact description.

My invention relates to an improvement in gates, and has for its object to provide a field or yard gate capable of being expeditiously and conveniently opened and closed, and to provide a means whereby the gate may be adjusted to clear it from snow and ice in the winter, and also to construct the gate so that it will swing upward and backward upon a pivot in opening and upward and forward in closing, and to provide the gate with a movable weight, which, in conjunction with levers connected with the gate, will admit of its being opened or closed by a child, if necessary.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a central vertical section through the gate and its posts. Fig. 2 is a vertical section taken on the line $x\ x$ of Fig. 1. Fig. 3 is a plan view. Fig. 4 is a section taken on the line $z\ z$ of Fig. 1. Fig. 5 is a section taken through the gate on the line $y\ y$ of Fig. 1, and Fig. 6 is a horizontal section taken on the line $w\ w$ of Fig. 4.

In constructing the gate four gate-posts 10 are employed, arranged in pairs, which pairs are located at suitable distances apart, and the posts of each pair are spaced by a sill 11, to which they are attached at their lower ends, the posts being preferably attached to the sides of the sill. The two pairs of posts are connected at the top by a preferably single-arched cross-bar 12, which cross-bar is provided with a central opening 13, extending through from top to bottom. The arched cross-bar may, if desired, be constructed in two pieces, spaced and connected by suitable blocks at their ends. Upon the inner faces of the rear posts 10, near the bottom of said posts, yet above the sill 11, journal-boxes 14 are located, in which boxes the pintle or axle 15, upon which the gate is swung, has its bearing. The boxes are made adjustable, so that the gate may be adjusted to or from the sill 11, as the nature of the weather may require.

The gate is preferably made double—that is, a series of slats 16 constitutes one face of the gate and a second series of slats 17 constitutes the opposite face—and the slats comprising the faces of the gate are spaced by top and bottom cross-bars 18 and 19, to which they are secured. The slats upon one side are preferably made to extend upward beyond the top cross-bar 19, and the slats at the opposite side terminate at the top of said cross-bar, as shown in Fig. 5. This arrangement of the slats has been found to more properly balance the gate.

In the chamber A, between the slatted faces of the gate, an inclined beam 20 is located, which beam is secured to the back board 21 of the gate, at its rear end and extends diagonally downward to an engagement with the upper face of the lower cross-bar 18 of the gate near its forward end, which end is closed by a front board 22, as is best shown in Fig. 1. Within the chamber A of the gate and upon the upper face of the inclined beam 20 a circular weight 23 is held to slide freely. This weight may be in disk or in ring form, as in practice may be found most advantageous.

The hinge of the gate consists of a horizontal bar 24 and a vertical bar 25. The horizontal bar 24 is secured to the bottom of the gate and extends some distance rearward beyond its rear edge, and the projecting portion of the hinge-bar 24 is provided with a series of apertures $24^a$, and the said hinge-bar 24, at or near its rear end, is held to turn upon the axle or pintle 15, journaled in the boxes 14. The vertical hinge-bar 25 is screwed to the rear edge of the gate and is provided at its lower end with a threaded pin 26, adapted to pass down through one of the apertures $24^a$ in the horizontal hinge-bar. The lower end of the pin has screwed thereon a suitable nut. By this means the hinge-bars are connected and the gate attached to the hinge.

It is evident that the gate may be set forward or rearward upon its hinge, as in practice may be found desirable and as the nature of the weight and lever employed in opening and closing the gate may demand.

In the space or opening 13, within the upper arched cross-bar of the gate-posts, a curved lever 27 is fulcrumed at one side of its center, the longer end of the lever extending over the forward portion of the gate, while the rear end of the lever is made heavier than the forward end. The rear end of the lever is connected with the gate below its center and near its rear edge by a link 28, or the equivalent thereof, and when the gate is to be employed as a field-gate brackets 29 are secured to the upper faces of the rear posts, being curved outwardly at their upper ends beyond the outer faces of the posts, and upon the upper ends of the brackets levers 30 are fulcrumed, the fulcrum of the levers being located nearer their inner than their outer ends, and the inner or shorter ends of the levers are connected by links 31 with the upper surface of the curved main lever 27, as is illustrated in Fig. 1. Ordinarily but a single link is employed, to which both levers 30 are connected. The outer or longer ends of the levers have attached thereto ropes or chains 32, which hang downward within convenient reach of a person either walking or riding, and the ropes or chains 32 have secured to their lower ends handles 33, which handles act in the capacity of weights.

The weights upon the levers and the weight on the gate serve to counterbalance the gate, and, as the weight 23 in the gate is a shifting one, as the gate is thrown upward the weight will roll downward to the edge of the gate leaning in direction of the sill and force the gate downward over the sill.

For a yard-gate the levers 30 are dispensed with and in their stead slideways 34 are made in the forward posts 10, as shown in Fig. 1, and in these slideways the cross-bar 35 of a vertical board or plate 36 is capable of vertical movement. The board or plate has attached to its inner face a weight 37, and the downward movement of the plate or board is limited by the weight coming in engagement with a stop-pin 38. The plate or board has secured thereto at each side a wear-plate 39, which wear-plates are located at the outer faces of the forward posts and are capable of free movement thereon. These wear-plates are provided with hand-blocks 40 or the equivalent thereof, whereby the movable board or plate 36 may be manipulated. The entire arrangement just described is adapted to open and close the gate, and is equivalent to the levers 30, heretofore spoken of, as the weight 37 is connected with the forward end of the main lever 27 of the gate by a link 41 or the equivalent thereof.

The space between the front posts 10 is usually closed by a facing-plate 42; but the space between the rear posts is unclosed, and a block 43 is located upon the sill at the rear of these posts, adapted to receive the gate when the latter is opened.

In operation, when the levers 30 are employed to open the gate if a person desires to pass through the gate, said gate being closed, a convenient lever 30 is drawn quickly downward, whereupon the forward end of the gate is thrown upward, the gate turning upon its axis, and the weight 23 travels along the inclined plane of the beam 20 past the center of the beam, and in engaging with the rear board or plate 21 of the gate forces said gate downward in engagement with the stop-plate 43, as is shown in dotted lines, Fig. 1. After passing through the gate the person may close the same by drawing down the lever 30 upon the opposite side, whereby the gate is elevated and thrown forward, and as the center of the gate passes through the rear posts the rolling weight 23 drops down to the front of the gate and forces said gate to its closed position. The fulcrum of the levers 30 and the heft of the weights 33 are so calculated with respect to the weight of the gate and the shifting weight in the gate that but a minimum of exertion is required to open or to close the gate.

When the gate is used as a yard-gate and the levers 30 are dispensed with, the gate is opened and closed by quickly drawing downward the weight-plate 36, and the said weight-plate, when the gate is in either its closed or its open position, is automatically carried upward in a position to be again pressed downward by the upward movement of the forward end of the main lever 27. It will be observed that the gate above described is exceedingly simple, durable, and economic in construction.

Having thus described my invention, I claim as new and desire to secure by Letters Patent—

1. The combination, with the vertically-swinging gate, its posts, and cross-piece connecting the upper ends of the posts, of the lever 27, pivoted to the cross-piece parallel therewith, the link 28, connecting the lever and gate, the vertically-movable weighted slides mounted in ways on the front gate-post, links 41, connecting the lever and the slides, and handles projecting from the slides, substantially as set forth.

2. A gate adapted to swing both upward and downward upon an axis and provided with an adjustable hinge fulcrumed upon said axis, as and for the purpose specified.

3. The combination, with supports and boxes adjustably secured to said supports, of a pintle journaled in said boxes, a gate, and a hinge comprising two sections, one section secured to the bottom of the gate and fulcrumed upon the pintle and the other section secured to the rear of the gate and attached to the lower section, as and for the purpose set forth.

4. In a gate, the combination, with supports, boxes adjustably attached to the supports, and a pintle journaled in said boxes, of a gate provided with a sliding weight and a hinge consisting of two sections, one hinge-section being pivoted upon the pintle and secured to the bottom of the gate and the other hinge-section being secured to the end of the gate and adjustably attached to the lower section, a lever, and means, substantially as shown and described, for connecting the lever with the gate, as and for the purpose set forth.

HIRAM BARKER.

Witnesses:
 JNO. WILLIAMS,
 JNO. DONOVAN.